United States Patent [19]
White et al.

[11] Patent Number: 6,022,137
[45] Date of Patent: Feb. 8, 2000

[54] CONDITIONER FOR PROCESSING RAW GRAIN COMPOSITION TO PRODUCE PELLETIZED FEED

[75] Inventors: Stanley B. White, Wooster; John D. Menches, Uniontown; Douglas Mote, Hollansburg, all of Ohio

[73] Assignee: Buckeye Feed Mills, Inc., Dalton, Ohio

[21] Appl. No.: 09/069,605

[22] Filed: Apr. 29, 1998

[51] Int. Cl.[7] .............................. A23L 1/00; A23L 3/00; A23N 17/00; B01F 7/04; B01F 15/06

[52] U.S. Cl. ......................... 366/295; 99/487; 99/516; 99/348; 366/313; 366/325.1; 366/325.92; 425/209; 425/311; 425/331; 425/DIG. 230

[58] Field of Search ..................... 099/487, 516, 099/517, 348; 366/295, 325.1, 325.92, 152.2, 158.1, 181.8, 313; 264/141, 148, 349; 425/209, 204, 311, 331, 143, 145, 365, 207, DIG. 230; 426/18, 69, 623, 636, 516, 517, 510, 511, 447, 448

[56] References Cited

U.S. PATENT DOCUMENTS

| | | | |
|---|---|---|---|
| 2,947,632 | 8/1960 | Kruse | 99/6 |
| 3,573,924 | 4/1971 | Zarow | 99/6 |
| 3,932,736 | 1/1976 | Zarow et al. | 235/151.1 |
| 4,001,452 | 1/1977 | Williams | 426/454 |
| 4,055,673 | 10/1977 | Mueller et al. | 426/231 |
| 4,183,675 | 1/1980 | Zarow | 366/144 |
| 4,247,501 | 1/1981 | Easley et al. | 425/207 X |
| 4,256,771 | 3/1981 | Henderson et al. | 426/250 |
| 4,281,934 | 8/1981 | Krause et al. | 366/326.1 |
| 4,438,634 | 3/1984 | Merle et al. | 366/326.1 |
| 4,669,966 | 6/1987 | Deuren | 366/313 X |
| 4,721,448 | 1/1988 | Irish et al. | 99/487 X |
| 4,779,970 | 10/1988 | Irish et al. | 350/584 |
| 4,801,210 | 1/1989 | Gian | 366/181.8 X |
| 5,043,175 | 8/1991 | Bayley et al. | 426/318 |
| 5,096,302 | 3/1992 | Durina | 264/349 X |
| 5,137,745 | 8/1992 | Zukerman et al. | 426/618 |
| 5,143,734 | 9/1992 | Sardinskas | 425/143 X |
| 5,194,275 | 3/1993 | Greer | 426/231 |
| 5,242,292 | 9/1993 | Wenger | 425/311 X |
| 5,437,882 | 8/1995 | Greer et al. | 99/516 X |
| 5,442,995 | 8/1995 | Greer | 99/487 |
| 5,460,448 | 10/1995 | Woolsey | 366/325.1 X |
| 5,598,770 | 2/1997 | Campbell et al. | 99/487 |
| 5,622,744 | 4/1997 | Matson et al. | 426/623 |
| 5,645,345 | 7/1997 | O'Neill et al. | 266/186 |
| 5,662,901 | 9/1997 | Tobey, Jr. et al. | 366/295 |
| 5,744,186 | 4/1998 | Harrison | 426/511 X |
| 5,897,886 | 4/1999 | Harrison | 425/209 |

OTHER PUBLICATIONS

Drawing for conditioner shaft assembly for conditioner commercially available from Ingersoll–Rand Company, May 29, 1991.

"Feed Manufacturing Technology IV", American Feed Industry Association, Inc. (1994), pp. 114–116, undated.

Primary Examiner—Timothy Simone
Attorney, Agent, or Firm—Barnes & Thornburg

[57] ABSTRACT

This invention relates to an apparatus and a method for hydrothermally processing a raw grain composition with steam in a conditioner as a preliminary step in the production of a pelletized feed product. More specifically, this invention is directed to an apparatus and a method for massing in-process grain composition in a chamber to enhance efficacy and efficiency of hydrothermal treatment and to improve the production rate and quality of pelletized feeds.

30 Claims, 7 Drawing Sheets

CONDITIONER FOR PROCESSING RAW GRAIN COMPOSITION TO PRODUCE PELLETIZED FEED

FIELD OF INVENTION

This invention relates to an apparatus and a method for hydrothermally processing a raw grain composition with steam in a conditioner as a preliminary step in the production of a pelletized feed product. More specifically, this invention is directed to an apparatus and a method for massing in-process grain composition in a chamber to enhance efficacy and efficiency of hydrothermal treatment and to improve the production rate and quality of pelletized feeds.

BACKGROUND AND SUMMARY OF THE INVENTION

Pelletized feeds are produced by hydrothermal treatment of a raw grain composition and processing the resulting mash. Typically the raw grain composition is processed in a conditioner where it is contacted and blended with steam injected into the conditioner with resultant gelatinization of at least a portion of the starch in the grain and formation of a heated, hydrated mash. The mash is delivered from the conditioner to a pellet mill where it is pressed through dies to form feed pellets. Typical industrial conditioners include steam treatment chamber and a series of blades that are attached to a rotatable tool bar mounted in the chamber. The blades are oriented on the tool bar to mix the grain composition with the injected steam and to advance the in-process grain composition through the conditioner. The tool bar is typically rotated at a high rate, often about 200 to 400 revolutions per minute. In practice, however, the raw grain composition is not uniformly processed (hydrothermally heated) because it is forced through the conditioner before the steam can be thoroughly blended with and penetrate the particulate constituents of the grain composition. The starch component in the pelletted product produced in such method is often insufficiently or not uniformly gelatinized resulting in poor quality feed pellets.

The present invention provides a method and apparatus for the improved manufacture of pelletized feeds. In one embodiment of the present invention there is provided an improved conditioner for hydrothermally processing a grain composition. The conditioner comprises a housing having a inlet end, an outlet end and a chamber positioned between the two ends. The conditioner includes a rotatable tool bar and first and second sets of radially extending blades, said blades positioned oriented to promote formation of a plug of in-process grain composition in the conditioner as a result of rotation of the tool bar during operation of the condition.

In one embodiment each blade in the first set of blades is oriented to lie in a first inclined position relative to the tool bar so that each blade in the first set of blades has a negative slope when viewed from a point away from the tool bar looking at the tip end of the blade. Each blade of the second set of blades is oriented to lie in a second inclined position relative to the tool bar so that each blade has a positive slope when viewed from a point away from the tool bar looking at the tip end of the blade. The tool bar is rotated during conditioner operation so that the first set of blades tends to advance the in-process grain composition from the inlet and toward the outlet end and the second set of blades tends to push the in-process grain composition toward the inlet end. The number and length of the blades in the first and second sets of blades can be variable as can the magnitude of the respective positive and negative slope inclinations of the blades within each set. Of course, the relative slope orientations of the first and second sets of blades can be reversed and the tool bar can be rotated in the opposite direction to provide an equivalent plug-forming effect.

The rate of rotation of the tool bar can be controlled/varied during conditioner operation to control plug formation and in-conditioner retention time of the grain composition. Raw grain composition is fed into the inlet end of the conditioner substantially continuously during conditioner operation and at variable controlled rate, and steam is continuously introduced into the conditioner chamber to process the grain composition as it is advanced through the conditioner by the action of the tool bar. Formation of the "plug" of the in-process grain composition in the conditioner chamber helps prevent the injected steam from escaping through the outlet end of the conditioner and improves efficiency of steam utilization in the process.

In one embodiment the first set of blades is positioned on the tool bar in an upstream region of the conditioner chamber near the inlet end, and the second set of blades is positioned on the tool bar in a downstream region of the interior chamber between the first set of blades and the outlet end. The plug-maker tool bar is coupled to a variable speed drive that can be controlled to rotate the tool bar at a defined speed/rotation rate within a range of speeds.

In another embodiment of the present invention, there is provided a method for increasing the rate of hydrothermal processing of a raw grain composition in a conditioner having a grain inlet, a grain outlet, an interior chamber positioned to lie between the grain inlet and grain outlet, a tool bar mounted for rotation in the interior chamber, a grain feeder for advancing the raw grain composition through the grain inlet and into the chamber, and a steam inlet for injecting steam into the interior chamber to contact the raw grain composition. The method comprises the steps of advancing the grain composition through the grain inlet and into the interior chamber of the conditioner, injecting steam into the interior chamber to contact the grain composition, forming a plug comprising the in-process grain composition in the chamber with negatively sloping blades and positively sloping blades coupled to the tool bar by continuously rotating the tool bar, continuing to inject steam into the chamber to complete the hydrothermal processing of the in-process grain composition as it is retained in the chamber as part of the plug, discharging portions of the processed grain composition in the plug through the chamber outlet, and substantially continuously replacing discharged portions of processed grain composition by delivering raw grain composition into the interior chamber through the inlet.

The present invention, therefore, comprises a conditioning chamber with an inlet and outlet end and a rotary blade assembly for advancing a grain composition from the inlet end to the outlet end. The blade assembly has blades at different pitches and/or locations to build a plug mass of grain in the composition chamber into which steam is injected to effect hydrothermal processing preliminary to pelletization of the composition. The blades are configured so that as the blade assembly is rotated at selected speeds, the grain composition is advanced from the inlet end of the chamber into the chamber to form part of the plug mass and ultimately through the outlet end of the chamber with the dwell time of the composition in the plug mass being sufficient to allow complete/effective hydrothermal processing of the composition to form a fluidized grain mash ideally suited for pellet milling.

DETAILED DESCRIPTION OF THE INVENTION

Generally this invention is directed to an apparatus and a method for massing and blending a grain composition in a conditioning chamber with steam to provide a processed grain composition that can be formed into high quality feed pellets. A grain composition-plug maker in the interior chamber of the conditioner includes a first and a second set of blades mounted on a rotatable tool bar. Rotation of the tool bar during delivery of steam and raw grain composition to the conditioner operates to fill the conditioner and form a plug in the chamber comprising a partly-processed grain composition. Filling and operating the conditioner by designed plug formation increases production without increasing energy costs. Formation of the plug of partly-processed grain composition in the chamber works to increase the conditioning time and efficiency thereby allowing more uniform/complete hydrothermal processing of the grain composition with concomitant improvement in pelletized feed product quality.

Figure 1:
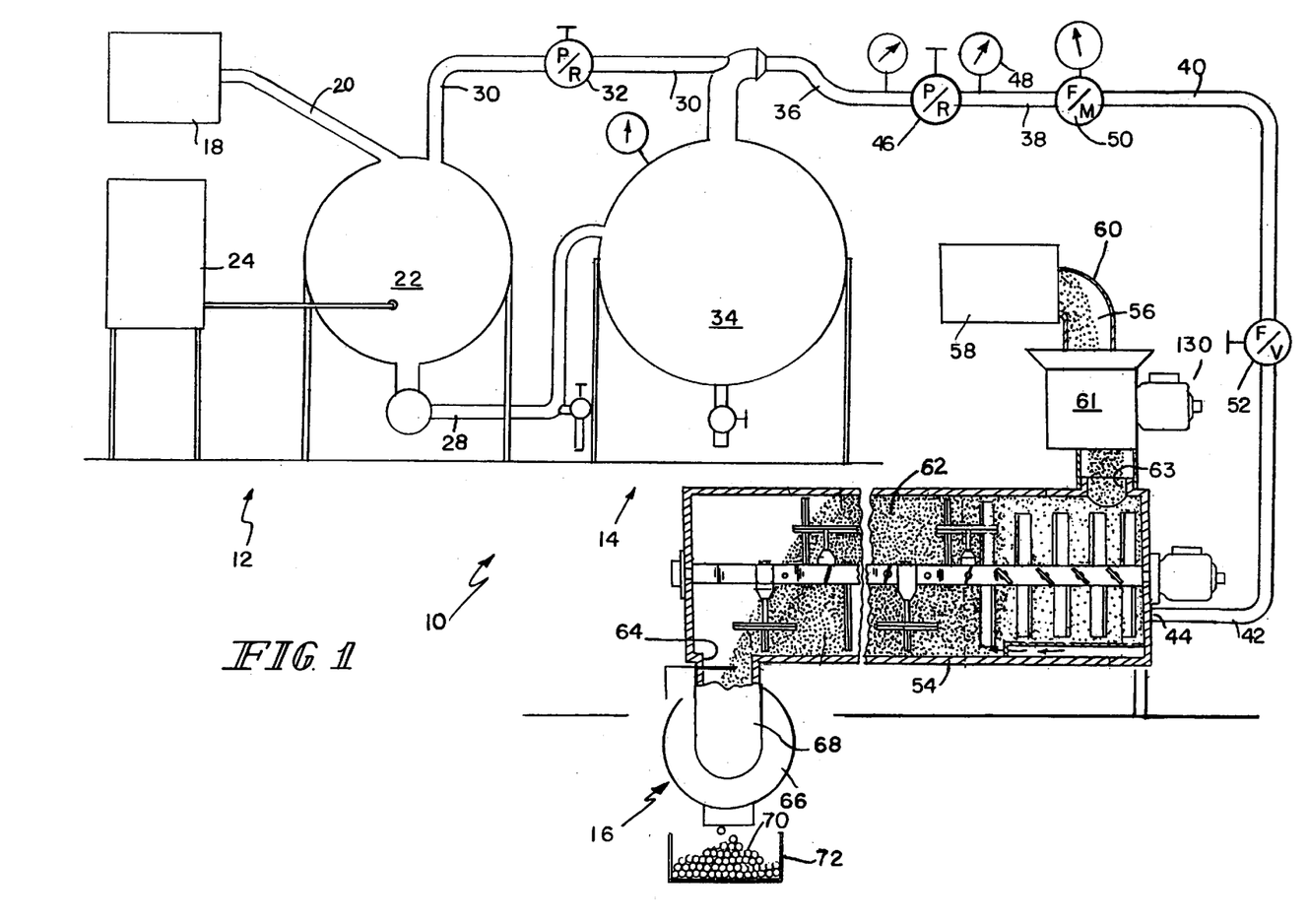
FIG. 1 is a schematic illustration of equipment for generating and delivering steam and a raw grain composition to a conditioning chamber for processing the raw grain composition in accordance with the present invention.

Referring now to FIG. 1, feed processing system 10 for providing a pelletized feed product comprises a water purification system 12, steam generating system 14, and pellet producing processor 16 including conditioner 54 and pellet mill 66. Boiler water for steam generation is supplied from water purifier 18 through conduit 20 to make up water tank 22 where chemicals such as oxygen depleting chemicals and alkalizers are combined with the water before it is delivered through conduit 28 to steam generating system 14. Methods of purifying boiler water are well known in the art. Preferably the boiler water supplied to steam generating system 14 is purified to have an electrical conductivity of less than about 3,700 micromhos to minimize steam-borne contaminants. The type of steam generator used to provide steam is not critical to this invention. Thus, for example, a Clayton-type steam generator or a bent tube boiler can be used to provide steam to the pellet producing processor 16. Steam is delivered to conditioner 54 through conduits 36, 38, 40, and 42 and through pressure reduction valve 46, flow meter 50, flow control valve 52, and steam inlet 44.

Steam, preferably non-superheated steam, is delivered through conduits 36, 38, 40, and 42 to conditioner 54 by operating the steam generator 34 at relatively low pressure, generally less than about 100 psi, and minimizing pressure reduction en route to the conditioner. Preferably the steam generator is operated a pressure of less than about eighty pounds per square inch, more preferably less than about sixty pounds per square inch. Typically pressure reduction valve 46 is selected to reduce the steam pressure in conduits 38, 40, and 42 to an amount no less than forty percent of the steam generator pressure, more preferably no less than fifty percent, most preferably no less than sixty percent of the steam generator pressure. The resulting saturated, non-superheated steam delivered to condition 54 enables uniform, consistent, hydrothermal processing of the raw grain composition.

Conduits 36, 38, 40, and 42 are sized to provide stoichiometric amounts of steam at a relatively low flow velocity to the conditioner in an amount and at a rate sufficient for effective hydrothermal treatment of raw grain composition being fed substantially continuously into the grain conditioning chamber. The low-velocity steam allows the raw grain composition in the grain conditioning chamber to absorb essentially qualitatively all of the moisture and heat from the steam. Preferably, conduits 36, 38, 40, and 42 are sized to deliver steam to the conditioning chamber at a velocity of about 8,000 to about 12,000 feet per minute (2,440 to about 3,660 meters per minute). Flow meter 50 displays the flow rate of steam delivered through the meter in pounds of steam per hour. Sizing of the steam conduits is calculated by determining the stoichiometric amount of steam needed per hour to process completely the raw grain composition to be delivered to the chamber during conditioner operation. Standard steam tables enable calculation of the size of pipe conduit necessary to deliver the required amount of steam per hour at the specified temperature, pressure, and velocity. A cylindrical pellet-mill conditioning chamber having dimensions of about 8 to about 12 feet in length (2.4 to about 3.6 meters) and about 12 to about 24 inches (30 to 60 cm) in diameter and coupled to a pellet mill rated for about 150 to about 225 horsepower can process a raw grain composition at a rate of about 18 to about 24 tons per hour (16 to about 22 metric tons per hour). Generally, about 100 to about 200 pounds (about 45 to about 90 kg) of steam are needed to process each ton (0.9 metric ton) of raw grain composition. Thus, the range of stoichiometric amounts of steam for processing a raw grain composition in this pellet mill conditioning chamber is about 1,800 pounds to about 4,800 pounds per hour (820 to about 2,180 kg per hour). Standard steam tables can be consulted to determine that a three inch (7.6 cm) diameter pipe can be used to deliver about 1,800 to about 4,800 pounds of steam per hour at a linear velocity of about 8,000 to about 12,000 feet per minute (2,440 to about 3,650 meters per minute).

A raw grain composition 56 stored in bin 58 is delivered to conditioning chamber 54 through grain conduit 60 by grain feeder 61 that is coupled to feeder drive 130. In conditioner 54 the raw grain composition is blended with steam to provide a partly-processed grain composition 62. Processed grain composition 62 is discharged from conditioner 54 through grain outlet 64 and delivered to pellet mill 66 through chute 68. The pelletized feed product 70 is produced from the partly-processed grain composition 62 in pellet mill 66. The pelletized feed product 70 is collected in container 72 where it is cooled before storage.

Figure 2:
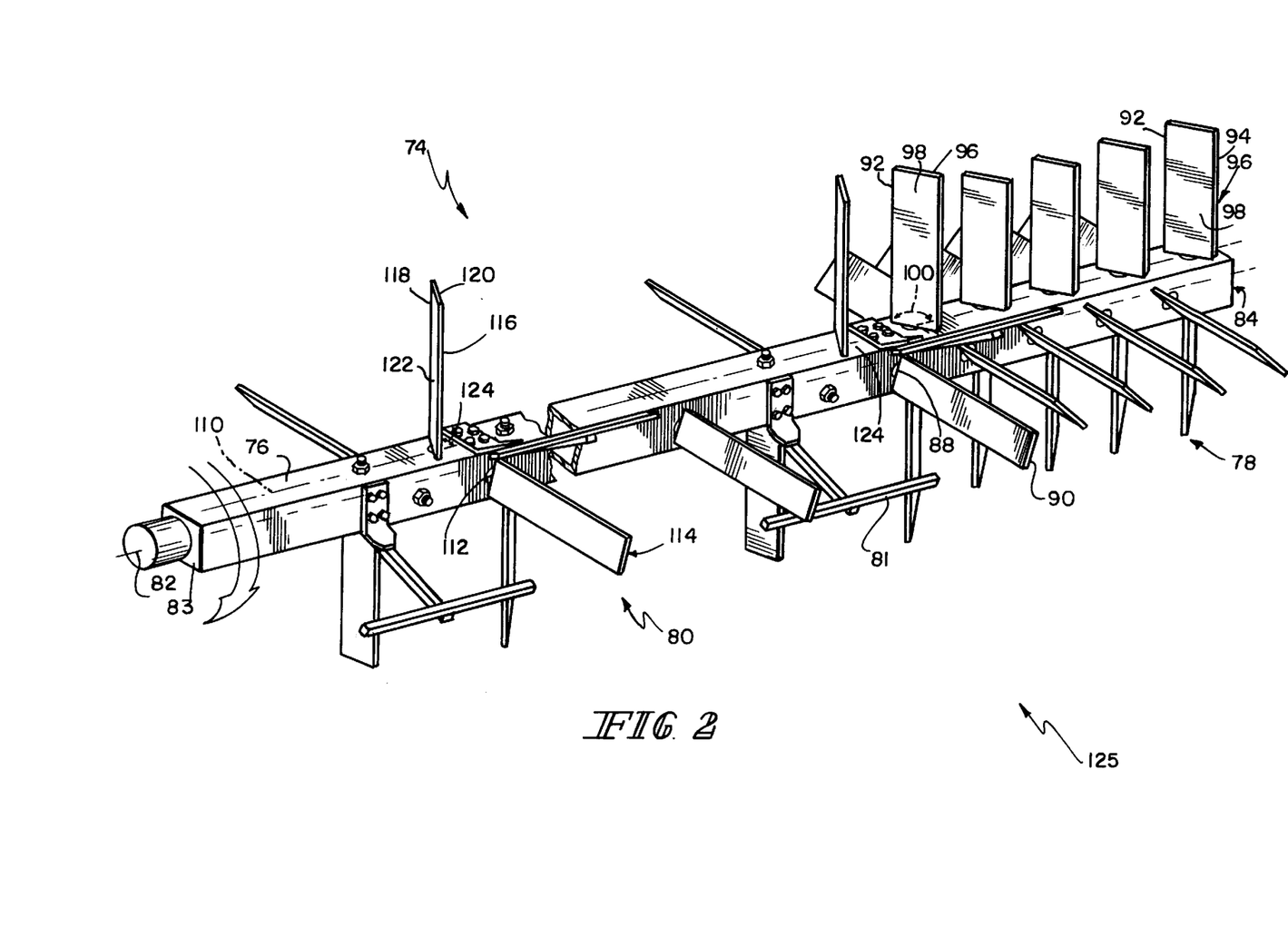
FIG. 2 is a perspective view of a tool bar for use in a conditioner in accordance with this invention.
Figure 3:
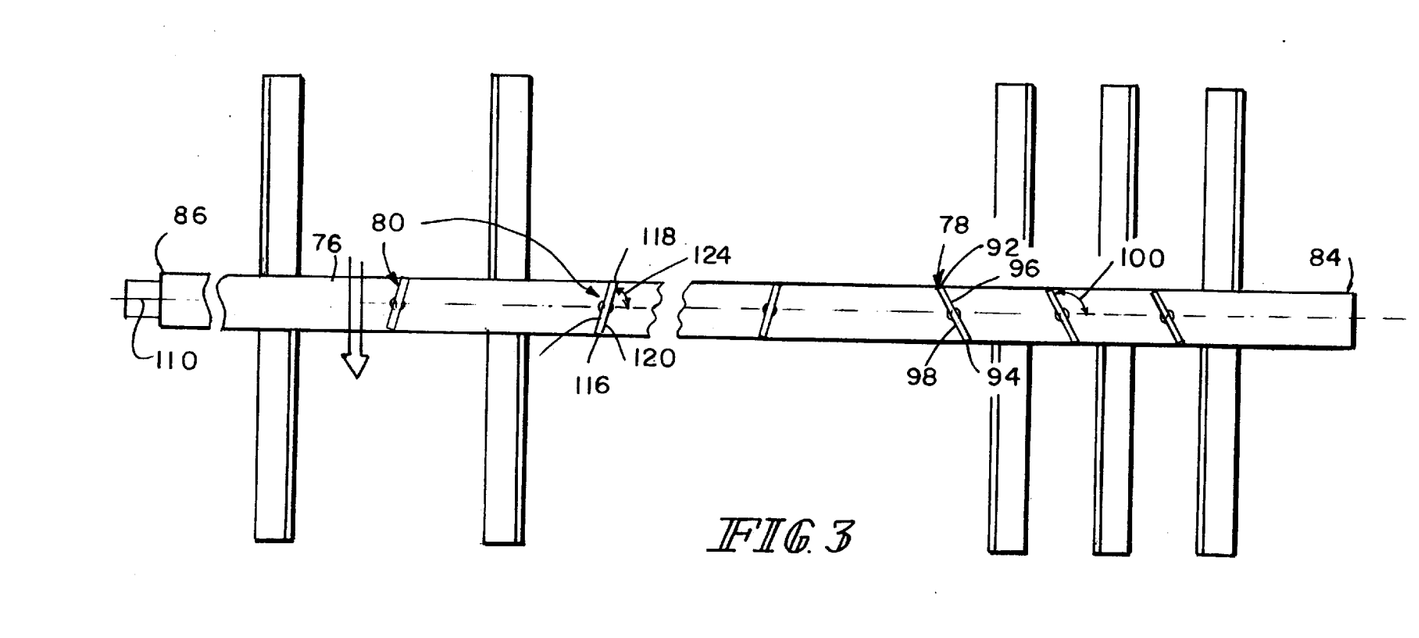
FIG. 3 is a partial side view of the tool bar of FIG. 2.
Figure 4:
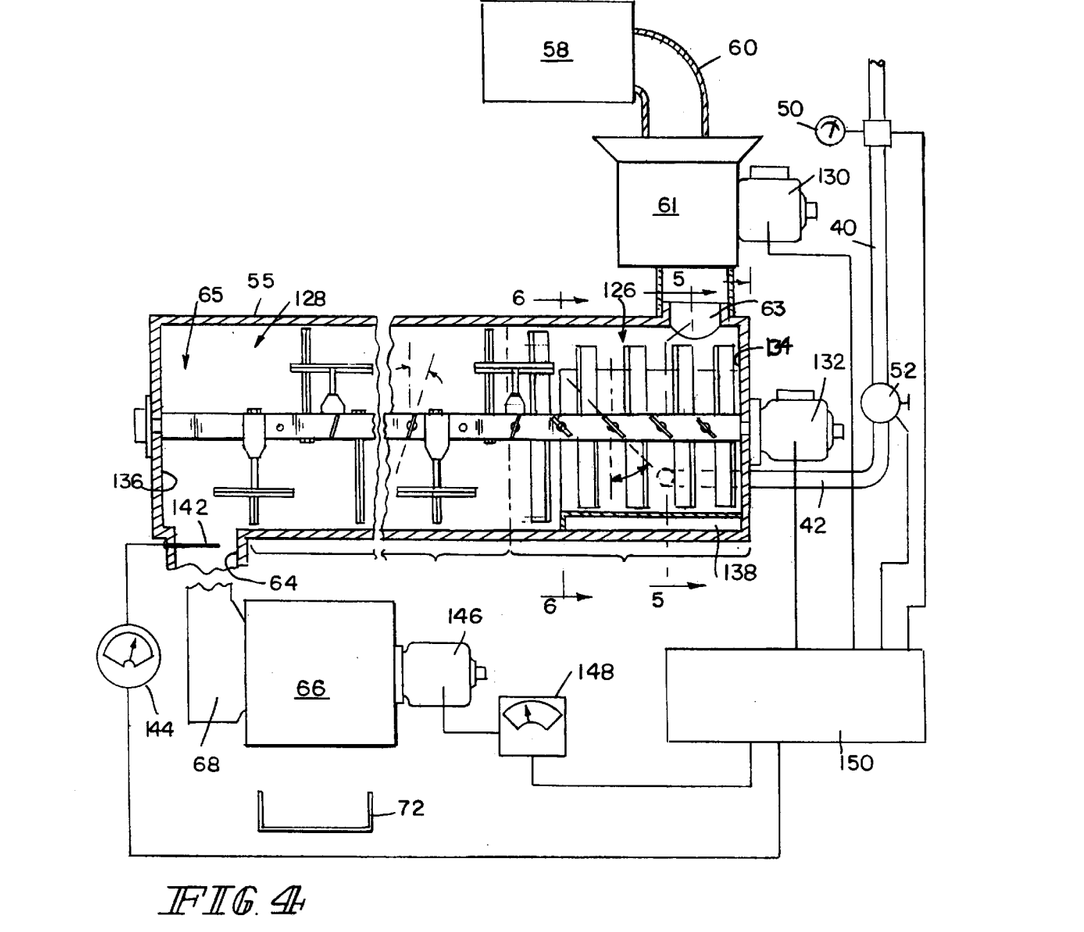
FIG. 4 is a cross-sectional view of the grain composition conditioner of this invention.

An illustrated embodiment of grain composition-plug maker 74 is shown in FIGS. 2–4. Plug-maker 74 includes tool bar 76, a first set of blades 78 and a second set of blades 80. The first and second sets of blades are mounted to and extend radially from tool bar 76. Optionally, the plug-maker 74 can include a set of wiper picks 81 that extend radially out from tool bar 76 and trace the interior walls of the housing of the conditioner 54 to increase the grain blending efficiency of the plug-maker.

Plug-maker 74 is mounted for rotation in the interior chamber of conditioner 54. Rotation of plug-maker 74 about an axis of rotation 82 operates to blend a raw grain composition with steam and form a plug 152 (See FIGS. 8 and 9) comprising partly-processed grain composition between the grain inlet 63 and grain outlet 64. Rotation of the tool bar and the included first and second sets of blades churns the partly-processed grain composition in the chamber and uniformly and continuously blends the grain composition with steam that is injected to the chamber of the conditioner through steam inlet 44 and thus prevents localized superheating of the grain. Rotation of plug-maker 74 also forms plug 152 in the conditioner chamber by massing the in-process grain composition to fill the full cross-section of the conditioner chamber 65 over at least a portion of its length. Plug formation increases both the conditioning time for processing the grain composition in the conditioner, and it increases the amount of a raw grain composition that can be processed through conditioner 54.

Plug-maker 74 includes tool bar 76 that extends the length of the interior chamber of conditioner 54. Tool bar 76 includes an upstream end 84 proximate to the inlet end 134 of housing 55 of conditioner 54, a downstream end 86 proximate to the outlet end 136. Tool bar 76 is mounted for rotation in chamber 65. Preferably the tool bar 76 is coupled to a variable speed drive 132 so that the tool bar 76 can be rotated at a range of speeds from about 50 to about 200, more preferable about 70 to about 150 revolutions per minute to provide optimum conditions for processing a raw grain composition. In a preferred embodiment the variable speed drive is a VARIMOUNT Series R80 Gear Motor manufactured by SEW-EURODRIVE. It is used for a conditioner eighteen inches in diameter by ten feet in length. During conditioner startup, the range of rotation speeds of the tool bar is about 95 to about 100 revolutions per minute. The shape of tool bar 76 is not critical for practicing the present invention; the tool bar may be cylindrical or prismatic having three or more sides. Preferably the tool bar 76 includes four sides arranged to provide the tool bar with a rectangular or square cross section. The each of the four sides of tool bar 76 are adapted for mounting blades.

A first set of blades 78 is mounted on tool bar 76. Each blade in the first set of blades 78 has a root end 88 adjacent to tool bar 76 and a tip end 90 that lies in a spaced apart relation to the tool bar. Each blade in the first set of blades has a leading edge 94 and a trailing edge 92. Each blade is angularly positioned so that the leading edge 94 is in an axial position (on the length of the tool bar) between the trailing edge 92 and the inlet end 134 of housing 55. A rearward surface 96 extends between leading edge 94 and trailing edge 92 and faces inlet end 134 of housing 55. A forward surface 98 extends between leading edge 94 and trailing edge 92 and faces outlet end 136 of housing 55. Each blade in the first set of blades 78 is oriented relative to tool bar 76 to define an included obtuse angle 100 between a portion of the rearward surface 96 including trailing edge 92 and a reference line 110 that is parallel to the axis of rotation 82 of tool bar 76. In a preferred embodiment of the present invention the obtuse angle 100 is about one hundred thirty-five degrees. When each blade in the first set of blades is viewed from a point away from the tool bar 76 looking toward the tip end 90 of the blade, each blade is oriented to lie in an inclined position having a negative slope relative to tool bar 76.

A second set of blades 80 is mounted on tool bar 76. Each blade in the second set of blades 80 has a root end 112 adjacent to tool bar 76 and a tip end 114 in a spaced apart arrangement from tool bar 76. Each blade in the second set of blades has a leading edge 116 and a trailing edge 118 positioned axially (on the length of the tool bar) to lie between leading edge 116 and inlet end 134 of housing 55. A rearward surface 120 extends between leading edge 116 and trailing edge 118 and faces inlet end 134. A forward surface 122 extends between leading edge 116 and trailing edge 118 and faces outlet end 136. Each blade of the second set of blades 80 is oriented relative to the tool bar 76 to define an included acute angle 124 between a portion of the rearward surface 120 including trailing edge 118 and reference line 110. In a preferred embodiment of the present invention, the acute angle 124 is about seventy-five degrees. When each blade in the second set of blades is viewed from a point away from the tool bar looking toward the tip end 114 of the blade, each blade is oriented to lie in an inclined position having a positive slope relative to the tool bar 76.

Each blade in the first set and second set of blades are arranged relative to one another so a forward surface 98 of a selected blade in the first set of blades 78 and the rearward surface 120 of a select blade in the second set of blades 80 converge in a direction toward the housing 55 and define an acute included angle therebetween of about fifty-five to about sixty-five degrees, more preferably, about sixty degrees. The first set of blades 78 is positioned on the tool bar to lie in an upstream region 126 of the interior chamber 65 and the second set of blades 80 is positioned on the tool bar 76 to lie in a downstream region 128 of the interior chamber 65 between the first set of blades 78 and the outlet end 136 of housing 55. Preferably, the wiper picks 81 are positioned on tool bar 76 to lie in downstream region 128 of the chamber 65.

Figure 5:
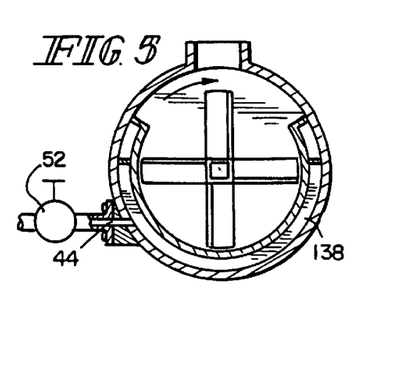
FIG. 5 is a sectional view taken along reference line 5—5 of the conditioner shown in FIG. 4.
Figure 6:
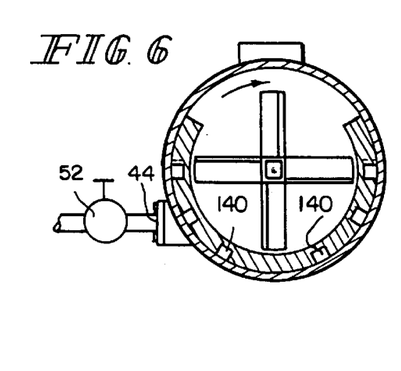
FIG. 6 is a sectional view taken along reference line 6—6 of the conditioner shown in FIG. 4.

Steam is injected through steam inlet 44 into chamber 65. In a preferred embodiment illustrated in FIGS. 5 and 6, steam is injected through steam inlet 44 into manifold 138. Manifold 138 is positioned to lie in upstream region 126 of the chamber 65 and includes steam ports 140 through which steam exits manifold 138 into chamber 65.

Figure 7:
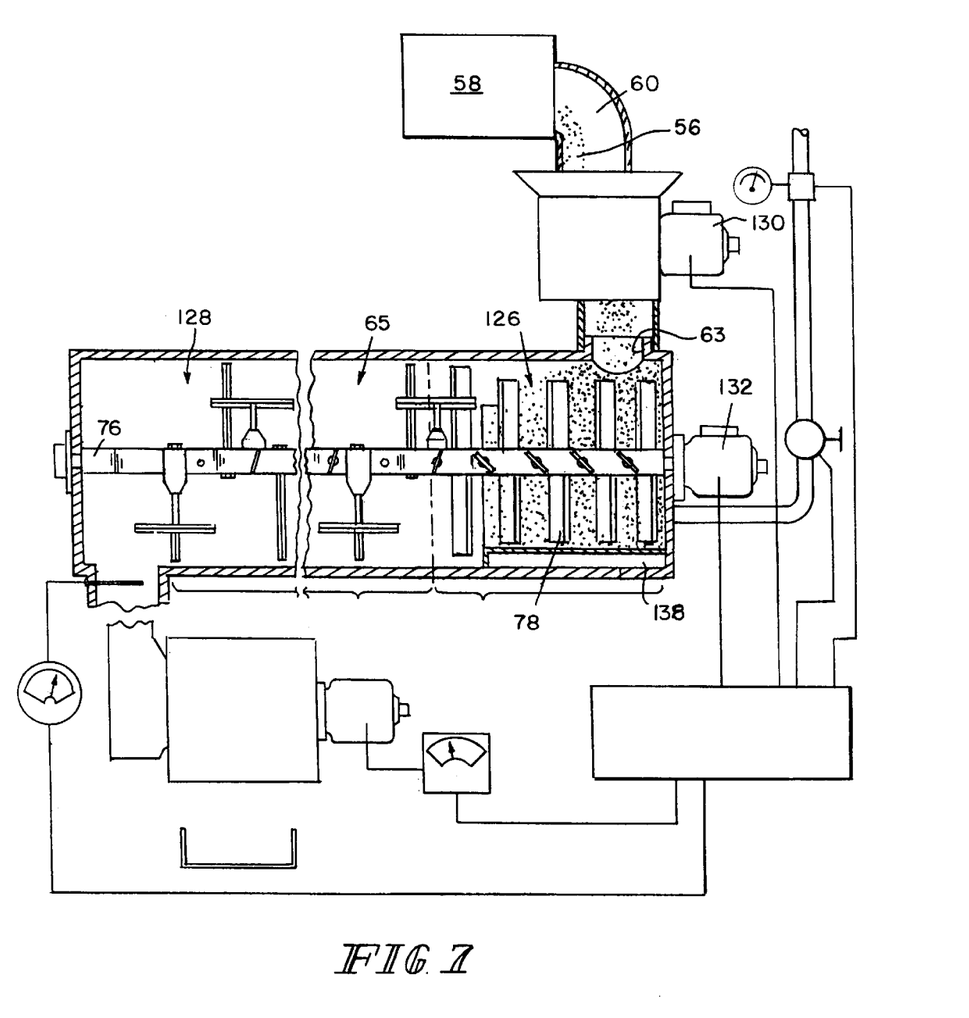
FIG. 7 is similar to FIG. 4 illustrating the introduction of a raw grain composition in to the upstream region of the interior chamber.
Figure 8:
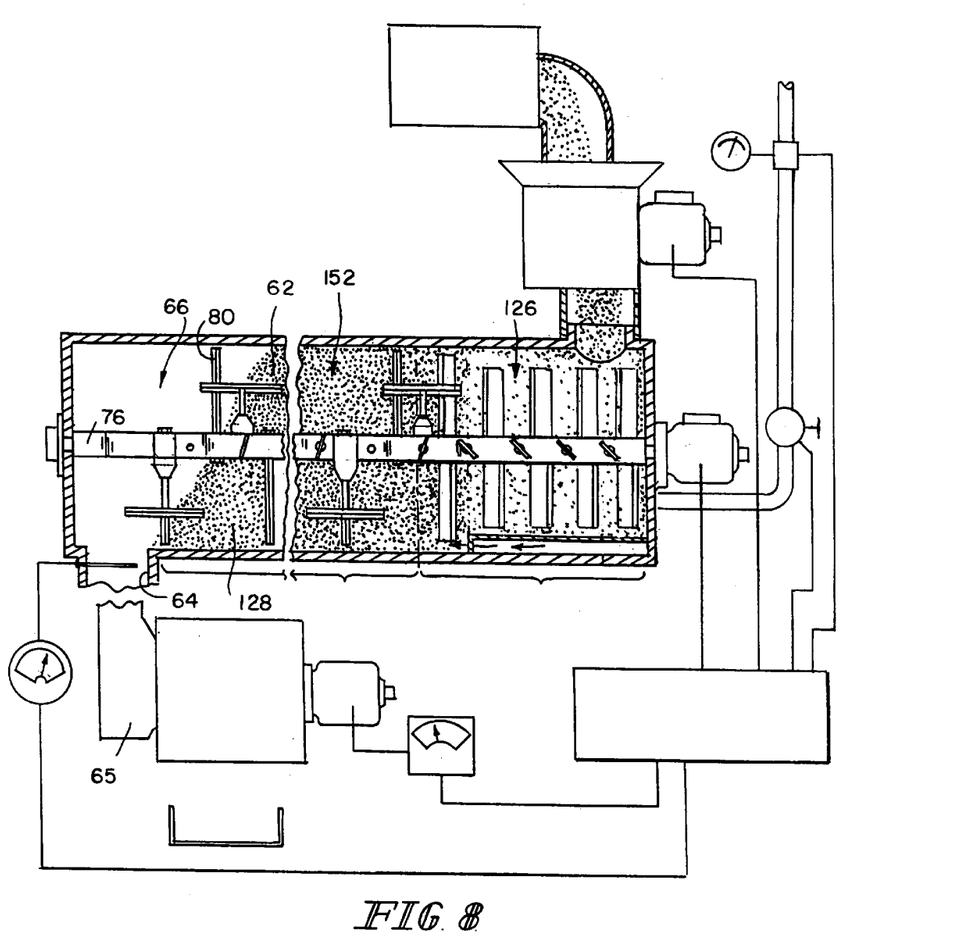
FIG. 8 is similar to FIG. 4 illustrating the formation of a plug comprising partly-processed grain in the downstream region of the interior of the conditioning chamber.
Figure 9:
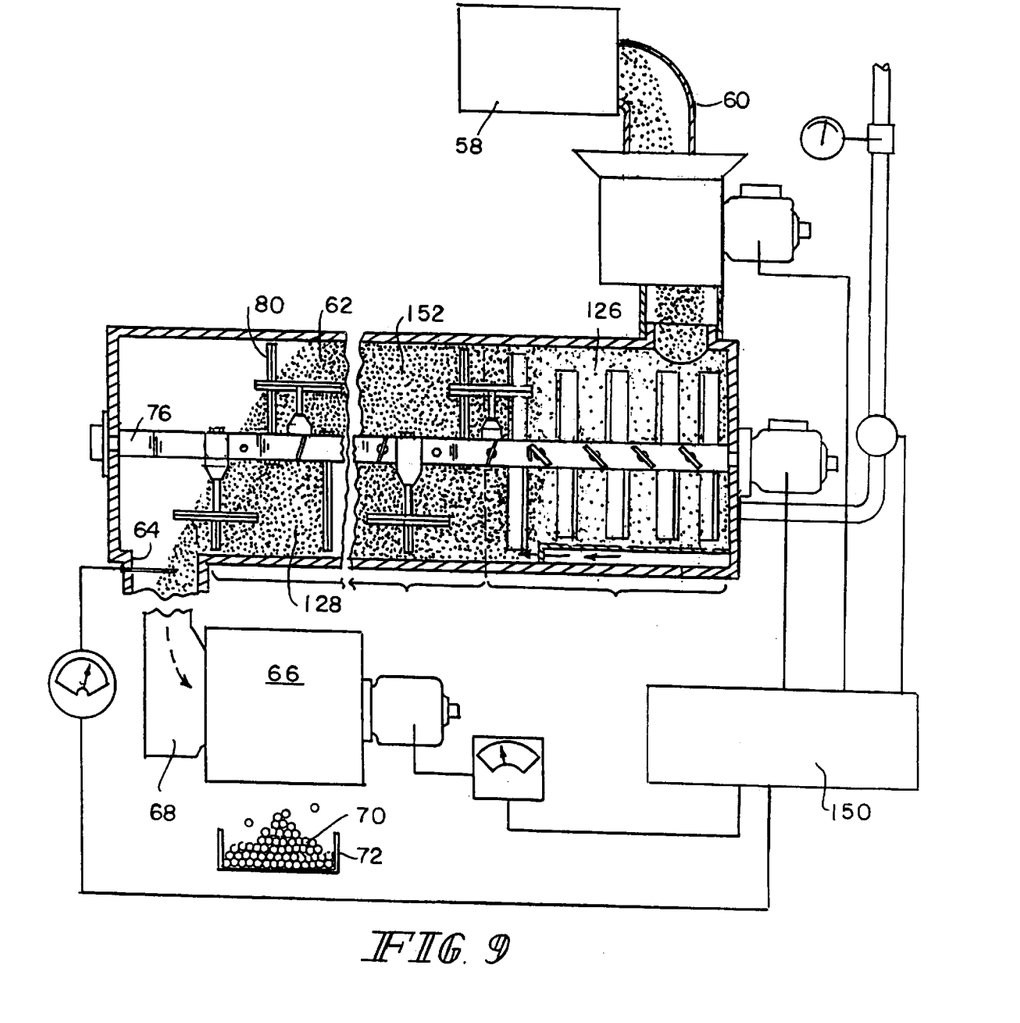
FIG. 9 is similar to FIG. 4 illustrating the flow of in-process grain composition during hydrothermal processing in accordance with this invention.

Referring now to FIGS. 7–9, a raw grain composition 56 is delivered through conduit 60 to grain feeder 61. Grain feeder 61 is coupled to feeder drive 130. Preferably feeder drive 130 includes a variable speed drive that can be controlled to vary the feed rate of the raw grain composition into the grain inlet 63. It is understood that the initial feed rate will vary depending on the nature of the raw grain composition and that the feed rate is varied from an initial rate to a final rate to optimize the production of a pelletized product. Raw grain composition 56 enters the upstream region 126 of interior chamber 65 through grain inlet 63. Rotation of tool bar 76 rotates the first set of blades 78 positioned in the upstream region 126 to advance raw grain composition 56 toward the downstream region of the chamber 65. Steam injected through steam inlet 44 into manifold 138 and through steam ports 140 contacts the raw grain composition 56 in chamber 65 initially to provide a partially-processed grain composition 62.

Rotation of tool bar 76 and the attached first set of blades 78 operate to advance the grain composition past the steam ports 140 and to prevent the grain composition from occluding the steam ports 140. The second set of blades on the tool bar 76 churn and blend the in-process grain composition with steam and impart resistance to flow of the composition toward outlet 64. As the blades on plug-maker 74 churn the grain composition to blend the grain with the steam, voids in the process composition are presented proximal to steam ports 140. As the steam fills the voids, the rate of steam flow into conditioner 54 rapidly increases as indicated by flow meter 50. When the plug 152 is fully formed, it contains no voids. Thus, flow meter 50 can be used to determine when the grain plug 152 is fully formed in the conditioner. When the flow meter indicates that the rate of steam flow is relatively constant, i.e., does not vary more than about ten percent over a about three to five minute time period, plug 152 has fully formed in the conditioner 54, and the in-process grain mass does not contain voids that are indicated by rapid variations the rate of steam flow into conditioner 54.

The raw grain composition received in the upstream region 126 progresses to the downstream region 128, where rotation of the tool bar 76 and the included second set of blades 80 blend the in-process grain composition with steam. As an increased amount of a grain composition enters the downstream region 128, rotation of tool bar 76 and the attached second set of blades 80 mass the partly-processed grain composition to form grain plug 152. Formation of grain plug 152 increases the conditioning time and allows more complete gelatinization the starch in the grain. Continued rotation of tool bar 76 along with the attached blades further blends the in-process grain composition in the grain plug 152 to homogeneously, hydrothermally process the grain particles that make up the in-process grain composition. Formation of grain plug 152 in the interior chamber prevents steam from directly venting into the atmosphere, for example, through outlet 64. Thus, essentially all the moisture and heat from the steam is absorbed by the partly-processed grain composition in chamber 65.

Once the plug of in-process grain is formed in the downstream region 128 of chamber 65, introduction of additional raw grain composition 56 into the upstream region 126 and advancing same under the influence of rotating tool bar 76 forces some of the in-process grain composition defining the grain plug 152 out grain outlet 64. The discharged grain composition is replaced with partly-processed grain composition from upstream region 126 of chamber 65. The processed grain composition discharged through outlet 64 is delivered through chute 68 to pellet mill 66 and formed into a pelletized feed product 70.

The process for providing a pelletized feed product in accordance with this invention may be optimized by monitoring certain key parameters such as the temperature of the partly-processed grain composition, the load on the pellet mill drive 146 and the flow rate of steam injected into the conditioner 54. The temperature of the partly-processed grain is measured using temperature sensor 142 that is located in grain outlet 64. Temperature sensor 142 measures the temperature of the processed grain composition that is passing through grain outlet 64 into chute 68. Preferably the temperature of the processed grain composition is about 110° F. (43° C.) to about 220° F. (104° C.), more preferably about 150° F. (65° C.) to about 200° F. (93° C.). The rate of steam flow into the conditioner 54 is monitored by flow meter 50. In practice, the amount of steam will vary depending upon the nature and amount of the raw grain composition undergoing processing in the conditioner. Preferably, the rate of steam flow is about 100 to about 200 pounds of steam per ton of raw grain composition, more preferable from about 140 to about 160 pounds of steam per ton of raw grain composition. The initial rate of steam flow is slowly increased until the temperature of the in-process grain reaches the desired temperature. After the desired temperature is reached, the feed rate of raw grain composition 56 introduced into the conditioner 54 is increased. The temperature of processed grain passing through outlet 64 is monitored, and the amount of steam injected into the conditioner 54 is adjusted to maintain the temperature of the processed grain composition within the desired temperature range. As the feed rate increases, the load on the pellet mill drive 146 also increases. Load sensor 148 measures the load on the pellet mill drive 146. It is important to monitor the load on the pellet mill drive 146 so the load does not exceed the specified maximum full load capacity for the particular pellet mill drive 146. The load on the pellet mill may be decreased by decreasing the feed rate or increasing the rate of steam flow into the conditioner. When the load on the pellet mill drive 146 increases in response to an increased feed rate, the rate of steam flow into the conditioner is increased by opening flow control valve 52 until the load on the pellet mill drive 146 decreases by about ten percent to about sixty percent. Once the load on the pellet mill drive drops, the feed rate is again increased and concomitantly the load on the pellet mill drive increases. The steps of increasing the rate of steam flow and the feed rate are repeated until the load on the pellet mill drive does not drop by more than about five percent to about ten percent when the steam flow is increased.

The adjustments to the feeder drive, the conditioner drive and the flow control valve may be made manually during operation of the conditioner. Alternatively, one or more of the steps in the processes may be computer controlled. Thus, a controller/computer 150 can receive inputs from one or more of sensing devices such as the steam flow meter 50, the temperature sensor 142 or load sensor 148 and in response to a predetermined value for each input, adjust the feed rate by adjusting the feeder drive 130, the rate of steam flow by adjusting flow control valve 52, or the variable speed conditioner drive 132 to optimize production and feed product quality.

The processed grain composition that is discharged through outlet 64 is pelletized in pellet mill 66 to provide a durable pellet that does not require the addition of a binder such as sodium bentonite, calcium bentonite, or lignin sulfonate. Typically, the pellets produced in accordance with this invention have a Pellet Durability Index (PDI) of about ninety percent to about one hundred percent. The PDI was determined by charging a metal pipe, two inches in diameter and one foot in length, with about one hundred grams of feed pellets and one hundred grams of a metal agitator such as ⅝ inch metal hexnuts. The two inch metal pipe is capped at both ends and then rotated end for end at about fifty revolutions per minute for about five minutes. The tube is then opened, and the intact pellets are separated from the fines. The PDI is determined according to the following equation:

$$PDI = \frac{\text{weight of intact pellets}}{\text{weight of pellets before tumbling}} \times 100$$

Use of this invention to form a plug of partly-processed grain composition in the conditioner chamber increases the conditioning time for a raw grain composition and increases production of the conditioner without increasing the production costs. The starch in the raw grain composition is more uniformly and completely gelatinized by steam in the conditioner. The resulting pelletized feed product is a better quality product that exhibits increased durability without the necessity of added binders.

We claim:

1. A conditioner for processing a grain composition, the conditioner comprising
    a housing having an inlet end, an outlet end, and an interior chamber positioned therebetween with an upstream region toward the inlet end and a downstream region toward the outlet end,
    a grain composition-plug maker including a rotatable tool bar mounted for rotation in the interior chamber about an axis of rotation, and
    first and second sets of blades extending radially out from the tool bar, each blade in the first and second sets of blades having a root end positioned to lie adjacent to the tool bar and a tip end positioned to lie in spaced-apart relation to the tool bar, each blade in the first set of blades being oriented to lie in a first inclined position relative to the tool bar to cause each blade in the first set of blades to have a negative slope when viewed from a point away from the tool bar looking at the tip end of said blade and in a direction toward the tool bar, each blade in the second set of blades being oriented to lie in a second inclined position relative to the tool bar to cause each blade in the second set of blades to have a positive slope when viewed from a point away from the tool bar looking at the tip end of said blade and in a direction toward the tool bar.

2. The conditioner of claim 1, wherein the first set of blades is positioned on the tool bar to lie in an upstream region of the interior chamber at the inlet end and the second set of blades is positioned on the tool bar to lie in a downstream region of the interior chamber between the first set of blades and the outlet end.

3. The conditioner of claim 2, wherein a selected blade in the first set of blades and a selected blade in the second set of blades cooperate to define an included angle of about 60° therebetween.

4. The conditioner of claim 2, wherein the grain composition-plug maker further includes a variable-speed drive coupled to the rotatable tool bar and configured to rotate the rotatable tool bar at a selected speed within a range of speeds.

5. The conditioner of claim 4, wherein the range of speeds is about 70 to 150 revolutions per minute.

6. The conditioner of claim 4, wherein the selected speed is about 95 revolutions per minute.

7. The conditioner of claim 1, wherein each blade in the second set of blades includes a forward surface facing toward the outlet end and a rearward surface facing toward the inlet end and cooperating with a reference line parallel to the axis of rotation of the rotatable tool bar to define an acute included angle therebetween.

8. The conditioner of claim 7, wherein the acute included angle is about 75°.

9. The conditioner of claim 7, wherein a selected blade in the first set of blades and a selected blade in the second set of blades cooperate to define an included angle of about 60° therebetween.

10. The conditioner of claim 1, wherein each blade in the first set of blades includes a forward surface facing toward the outlet end and a rearward surface facing toward the inlet end and cooperating with a reference line coextensive with the axis of rotation of the rotatable tool bar to define an obtuse angle therebetween and each blade in the second set of blades includes a forward surface facing toward the outlet end and a rearward surface facing toward the inlet end and cooperating with the reference line to define an acute included angle therebetween.

11. The conditioner of claim 10, wherein the obtuse included angle is about 135°.

12. The conditioner of claim 1, wherein the rotatable tool bar includes four side walls arranged to provide the tool bar with a rectangle-shaped cross section, the second set of blades includes a group of blades mounted on each of the four side walls, and each blade in each group of blades in the second set of blades includes a forward surface facing toward the outlet end and a rearward surface facing toward the inlet end and cooperating with a reference line parallel to the axis of rotation of the rotatable tool bar to define an included angle of about 75° therebetween.

13. The conditioner of claim 1, wherein each blade in the second set of blades includes a leading edge and a trailing edge positioned to lie in a position between the leading edge and the inlet end and the grain composition-plug maker further includes a drive system coupled to the rotatable tool bar and configured to rotate the rotatable tool bar about the axis of rotation in a first direction wherein the trailing edge follows the leading edge as the tool bar rotates about the axis of rotation.

14. The conditioner of claim 13, wherein the drive system includes a variable-speed motor and a motor speed controller coupled to the variable-speed motor.

15. The conditioner of claim 1, wherein the grain composition-plug maker further includes a variable-speed drive coupled to rotate the rotatable tool bar about the axis of rotation at a speed that descends from a first speed to a relatively lower second speed during start-up of the conditioner.

16. The conditioner of claim 1, wherein the grain composition-plug maker further includes a variable-speed motor coupled to the rotatable tool bar and means for operating the variable-speed motor to rotate the rotatable tool bar at a speed that descends from a first speed to a relatively lower second speed during initial stages of movement of a grain composition from the inlet end through the interior chamber in a direction toward the outlet end.

17. A conditioner for processing a grain composition, the conditioner comprising
    a housing having an inlet end, an outlet end, and an interior chamber positioned therebetween, and
    a grain composition-plug maker including a rotatable tool bar mounted for rotation in the interior chamber of the housing about an axis of rotation, a first set of negatively sloping blades extending radially out from the tool bar, each blade in the first set of blades having a trailing edge, a leading edge positioned to lie between the trailing edge and the inlet end of the housing, a rearward surface extending between the leading and the trailing edges and facing in a direction toward the inlet end, and a forward surface extending between the leading and trailing edges and facing in a direction toward the outlet end, each blade in the first set of blades being inclined relative to the tool bar to define an obtuse angle between a portion of the rearward surface thereof including the trailing edge and a reference line parallel to the axis of rotation of the tool bar to orient each blade in the first set of blades along a negative slope, and a second set of positively sloping blades extending radially out from the tool bar and being positioned on the tool bar to lie in the interior chamber in a region between the first set of blades and the outlet end, each blade in the second set of blades having a leading edge, a trailing edge positioned to lie between the leading edge and the inlet end of the housing, a rearward surface extending between the leading and the trailing edges and facing in a direction toward the inlet end, and a forward surface extending between the leading and trailing edges and facing in a direction toward the outlet end, each blade in the second set of blades being inclined relative to the tool bar to define an acute angle between a portion of the rearward surface thereof including the trailing edge and the reference line to orient each blade in the second set of blades along a positive slope.

18. The conditioner of claim 17, wherein the forward surface of a selected blade in the first set of blades and the rearward surface of a selected blade in the second set of blades are arranged to converge in a direction toward the housing and to define an acute included angle therebetween of about 60°.

19. The conditioner of claim 17, wherein the first set of blades is positioned on the tool bar to lie in an upstream region of the interior chamber toward the inlet end and the second set of blades is positioned on the tool bar to lie in a downstream region of the interior chamber between the first set of blades and the outlet end.

20. The conditioner of claim 19, wherein the grain composition-plug maker further includes a variable-speed drive coupled to the rotatable tool bar and configured to rotate the rotatable tool bar at a selected speed within a range of speeds.

21. The conditioner of claim 17, wherein the grain composition-plug maker further includes a variable-speed drive coupled to rotate the rotatable tool bar about the axis of rotation at a speed that descends from a first speed to a relatively lower second speed during start-up of the conditioner.

22. The conditioner of claim 17, wherein the grain composition-plug member further includes a variable-speed motor coupled to the rotatable tool bar and means for operating the variable-speed motor to rotate the rotatable tool bar at a speed that descends from a first speed to a relatively lower second speed during initial stages of movement of a grain composition from the inlet end through the interior chamber in a direction toward the outlet end.

23. A conditioner for continuous processing of a grain composition, the conditioner comprising a housing formed to include an inlet end, an outlet end, an interior chamber positioned therebetween and configured to define a passageway for the grain composition, a grain inlet into the passageway and positioned adjacent the inlet end, and a grain outlet out of the passageway and positioned adjacent the outlet end, and occlusion means for developing a plug of the grain composition in the passageway and for discharging some of the grain composition defining the plug out of the interior chamber through the grain outlet and replacing the grain composition that was discharged from the plug with other grain composition moving in the interior chamber from the grain inlet to maintain the plug in a position in the passageway occluding the grain outlet yet allowing the grain composition to move through the passageway and the plug and exit the passageway at the grain outlet.

24. The conditioner of claim 23, wherein the occlusion means includes a rotatable tool bar mounted for rotation in the interior chamber about an axis of rotation, a first set of negatively sloping blades coupled to an upstream portion of the tool bar to receive and mix grain composition admitted into the passageway through the grain inlet, and a second set of positively sloping blades coupled to a downstream portion of the tool bar to mix grain composition leaving the first set of negatively sloping blades and passing through the passageway toward the grain outlet.

25. The conditioner of claim 24, wherein the occlusion means further includes a variable-speed drive coupled to rotate the rotatable tool bar about the axis of rotation at a speed that descends from a first speed to a relatively lower second speed during start-up of the conditioner.

26. The conditioner of claim 24, wherein the occlusion means further includes a variable-speed motor coupled to the rotatable tool bar and means for operating the variable-speed motor to rotate the rotatable tool bar at a speed that descends from a first speed to a relatively lower second speed during initial stages of movement of a grain composition from the inlet end through the interior chamber in a direction toward the outlet end.

27. A conditioner for continuous processing of a grain composition, the conditioner comprising a housing formed to include a grain inlet, a grain outlet, and an interior chamber positioned to lie therebetween, a rotatable tool bar mounted to rotate in the interior chamber and to extend along the length of the interior chamber, and means on the tool bar for massing the grain composition moving through the interior chamber from the grain inlet toward the grain outlet during exposure of the grain composition to steam to form a plug in the interior chamber to occlude the grain outlet of the interior chamber with grain composition moving from the grain inlet through the interior chamber and the plug and discharging the grain composition through the grain outlet in response to rotation of the tool bar in the interior chamber while the grain composition is being introduced into the interior chamber through the grain inlet.

28. The conditioner of claim 27, wherein the occlusion means includes a rotatable tool bar mounted for rotation in the interior chamber about an axis of rotation, a first set of negatively sloping blades coupled to an upstream portion of the tool bar to receive and mix grain composition admitted into the passageway through the grain inlet, and a second set of positively sloping blades coupled to a downstream portion of the tool bar to mix grain composition leaving the first set of negatively sloping blades and passing through the passageway toward the grain outlet.

29. The conditioner of claim 28, wherein the occlusion means further includes a variable-speed drive coupled to rotate the rotatable tool bar about the axis of rotation at a speed that descends from a first speed to a relatively lower second speed during start-up of the conditioner.

30. The conditioner of claim 28, wherein the occlusion means further includes a variable-speed drive coupled to rotate the rotatable tool bar about the axis of rotation at a speed that descends from a first speed to a relatively lower second speed during start-up of the conditioner.

* * * * *